P. B. CURRIER.
FRICTION TRANSMISSION.
APPLICATION FILED OCT. 5, 1914.
1,208,505.
Patented Dec. 12, 1916.
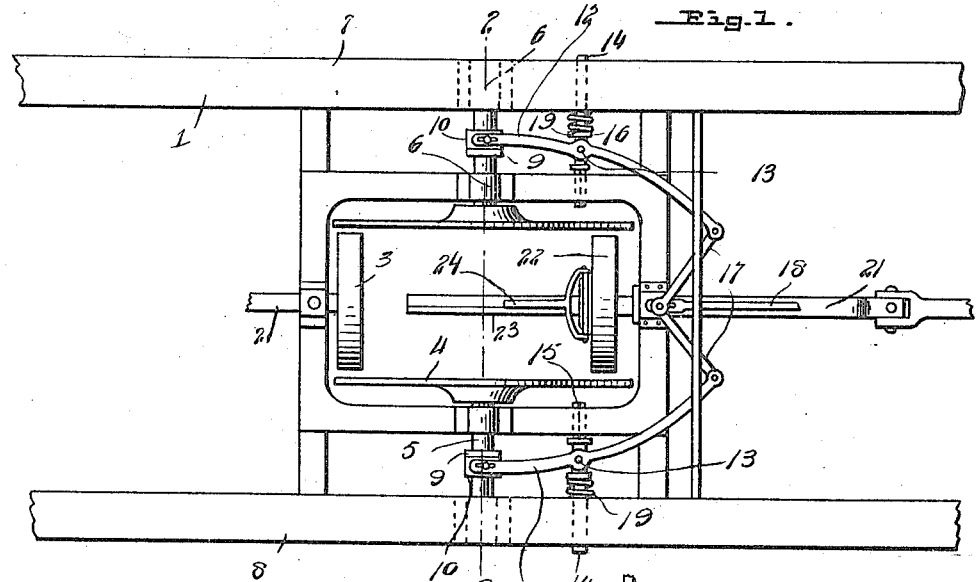
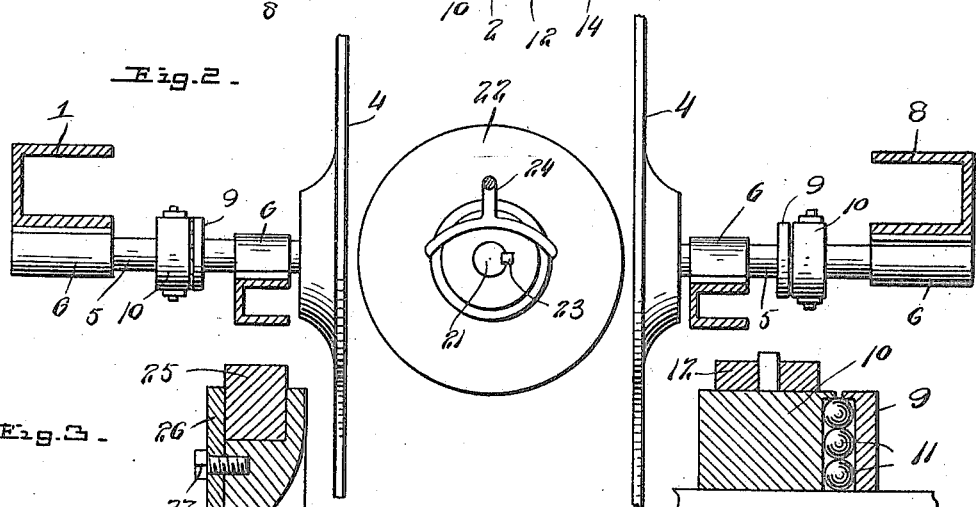
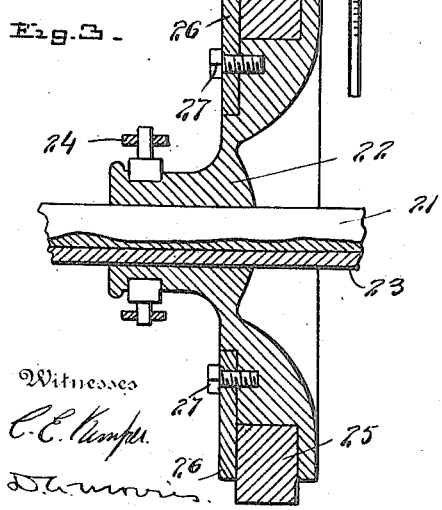
Witnesses
Inventor
P. B. Currier
Attorneys

UNITED STATES PATENT OFFICE.

PAUL B. CURRIER, OF AMESBURY, MASSACHUSETTS.

FRICTION TRANSMISSION.

1,208,505.  Specification of Letters Patent.  Patented Dec. 12, 1916.

Application filed October 5, 1914. Serial No. 865,120.

*To all whom it may concern:*

Be it known that I, PAUL B. CURRIER, a citizen of the United States, residing at Amesbury, in the county of Essex, State of Massachusetts, have invented certain new and useful Improvements in Friction Transmission; and I do hereby declare the following to be a full, clear, and exact description of the invention, such as will enable others skilled in the art to which it appertains to make and use the same.

This invention relates to a friction transmission.

An object of the invention is to provide a frictional transmission for automobiles wherein the necessity of using any gears will be obviated.

A further object of the invention is to so construct the device that rotary motion will be imparted to the drive shaft on both sides thereof and thus the possibility of the drive shaft being sprung will be obviated.

A further object of the invention is to so construct the device that the frictional engagement between the driving means and the driven means will be positive.

With these and other objects in view, such as will appear as the description progresses, my invention comprises the combination and arrangement of parts as set forth in and falling within the scope of the appended claim.

Referring to the drawing: Figure 1 is a plan view of my device, a portion of the vehicle being shown, and parts of the device broken away for convenience. Fig. 2 is a section on line 2—2 of Fig. 1. Fig. 3 is an enlarged detail of the friction disk on the differential shaft. Fig. 4 is a fragmental sectional view.

Referring to the drawing wherein like parts are indicated by like characters throughout the several views:—the reference character 1 indicates the chassis of the machine and the reference character 2 the crank shaft of the engine. On the end of this crank shaft is mounted a friction disk 3 which is constructed and arranged to coöperate with disks 4 extending at right angles thereto and rigidly secured to shafts 5 which are mounted in bearings 6 in the side bars 7 and 8 of the said chassis. These shafts 5 are adapted to be moved longitudinally of the said bearings 6 so as to bring the faces of the disks 4 into engagement with the periphery of the disk 3 and in order that they may be readily shifted simultaneously by the operator, I have provided on each of the shafts 5 a collar 9 which is fixed thereto and against which abuts a loosely mounted collar 10 having ball bearings 11 protruding over its face adapted to engage the face of the said collar 9.

Connected to the collar 10 is a shipper lever 12 which is pivoted between its ends, as at 13, to a rod 14, the said rod being slidably mounted through holes in the bars 7 and 8 of the chassis, but prevented from rotation by a squared end 15 and limited in its sliding movement by collars 16. In order that this lever 12 may be moved together with the collar 10 so as to normally grip the disk, I have pivotally secured to the ends of the levers links 17 which are in turn secured together and to an operating lever 18 which terminates in a foot piece (not shown) in reach of the operator.

Encircling the rod 14 is a coil spring 19 which normally tends to hold the disks 4 out of engagement with the disk 3, but which is of such tension as to permit the said disks to be moved into engagement with the disk 3 through the lever 18 as above described. Extending between these disks 4 and rotatably mounted in a bearing 20 is the drive shaft 21 which is connected to the differential on the rear axle, and has a universal joint therein so that the line of motion to the rear axle may be changed. Slidably mounted on this shaft between the said disks is a frictional disk 22 which is prevented from rotation with relation to the said shaft by a key 23; the diameter of this disk 22 is equal to the diameter of the disk 3 so that when the disks 4 are shifted into engagement with the periphery of the disk 3, the said disk 22 will be rotated together with the shaft 21 and when the parts are in the positions shown in Fig. 1 of the drawing the shaft 21 will be turned in a counter-clockwise direction and consequently the automobile will be driven ahead. However, in order that the speed of the machine may be varied or that the motion may be reversed, I have provided a shipper lever 24 connected to the disk 22 and to a foot lever within reach of the operator so that the disk may be moved so as to engage the faces of the disks 4 adjacent their peripheries, or may be moved toward the centers of the said disk so as to change the turning ratio between the disk 22 and the disks 4 or the said disk 22 may be shifted to the opposite side of the centers of the disks 4 to that shown in Fig. 1 and when in this position the reverse motion will be transmitted to the differential shaft 21. The friction disks 3 and 22 have secured to their peripheries wear members 25 which are maintained thereon by plates 26 secured to the said disks by bolts 27.

It may thus be seen that I have provided a frictional transmission by means of which the direction of motion of the differential shaft may be reversed, and I have so constructed the device that the parts thereof may be shifted so as to reduce or increase the speed of the differential shaft as desired.

It will be noted in the construction of this transmission, I have done away with gears completely, and I have provided a frictional driving disk on each side of the disk which is carried by the differential shaft so that the rotational movement will be imparted to each side of the said disk and thus the pressure on the driving disks will not tend to spring the differential shaft and a more positive engagement between the friction disks may therefore be had.

While I have described and illustrated a particular embodiment of my invention it has merely been done for the sake of convenience and I do not wish to be limited to that particular embodiment as it is obvious that numerous changes may be made in the details of construction thereof without in any way departing from the spirit of the invention or exceeding the scope of the appended claim.

What is claimed is:—

In a friction transmission in combination with a frame, a friction disk constructed and arranged to be mounted on a crank shaft of an engine, a second disk adapted to be slidably mounted on the differential shaft, a pair of disks arranged at right angles to the first named disks and adapted to simultaneously engage the sides of the first named disks, and having supporting shafts supported by the frame, second shafts arranged parallel of the first shafts and supported by the frame, said shaft having collars slidably mounted thereon, shipper levers pivotally connected to the second shafts and slidably connected to the first named shafts, coil springs encircling the second shafts and having one of their ends engaged with the frame and their other ends engaged with the collars for forcing the forward ends of the levers away from each other, as and for the purpose set forth.

In testimony whereof, I affix my signature, in the presence of two witnesses.

PAUL B. CURRIER.

Witnesses:
AURELIA F. CURRIER,
HELEN V. HORTT.